(12) United States Patent
Ibaraki et al.

(10) Patent No.: US 7,965,744 B2
(45) Date of Patent: Jun. 21, 2011

(54) TRANSMISSION SYSTEM WITH APPARATUS FOR TRANSMITTING AND RECEIVING AUDIO DATA AUXILIARY DATA

(75) Inventors: Susumu Ibaraki, Sakai (JP); Akihiro Yamamoto, Osaka (JP); Toshiaki Mori, Minou (JP)

(73) Assignee: Panasonic Corporation, Osaka (JP)

( * ) Notice: Subject to any disclaimer, the term of this patent is extended or adjusted under 35 U.S.C. 154(b) by 1115 days.

(21) Appl. No.: 11/435,567

(22) Filed: May 17, 2006

(65) Prior Publication Data

US 2006/0239302 A1 Oct. 26, 2006

Related U.S. Application Data

(62) Division of application No. 10/047,282, filed on Jan. 14, 2002, now abandoned.

(30) Foreign Application Priority Data

Jan. 12, 2001 (JP) ................................. 2001-005640

(51) Int. Cl.
*H04J 3/04* (2006.01)
(52) U.S. Cl. ...................... 370/535; 370/536; 370/537
(58) Field of Classification Search .......... 370/200–253, 370/272–309, 431–546, 395.64, 389–427
See application file for complete search history.

(56) References Cited

U.S. PATENT DOCUMENTS

| | | | | |
|---|---|---|---|---|
| 4,348,739 A | * | 9/1982 | Deaver et al. .................... | 710/8 |
| 4,558,180 A | * | 12/1985 | Scordo ..................... | 379/202.01 |
| 5,038,402 A | * | 8/1991 | Robbins ......................... | 725/144 |
| 5,311,550 A | * | 5/1994 | Fouche et al. ................ | 375/260 |
| 5,535,277 A | * | 7/1996 | Shibata et al. ................... | 380/28 |

(Continued)

FOREIGN PATENT DOCUMENTS

JP 05130558 A 5/1993

(Continued)

OTHER PUBLICATIONS

Standardization of DVD-Audio Specification, Matsushita Technical Journal vol. 45, No. 6; © Dec. 1999; pp. 122-129.

(Continued)

*Primary Examiner* — Ricky Ngo
*Assistant Examiner* — Iqbal Zaidi
(74) *Attorney, Agent, or Firm* — Marjama Muldoon Blasiak & Sullivan LLP (57) ABSTRACT

A transmission system includes a transmission apparatus and a receiving apparatus for repeatedly transmitting and receiving a frame with plural time slots at a constant frequency, in which digital audio data of plural channels and auxiliary data required to playback the digital audio data are transmitted using previously allocated time slots. A multiplexer is provided for multiplexing, assuming an area made up of previously allocated time slots that are included in respective frames amounting to a number of a multiple of n as block data when the predetermined encryption unit is n bytes. The digital audio data and the auxiliary data are allocated as the block data wherein the auxiliary data is allocated to the time slots that are located at the same positions of respective plural frames within the block data, and the digital audio data is allocated in the time slots that are located at the same position in the respective frames amounting to the number of a multiple of n in the block data. An encryptor encrypts at least the digital audio data from the multiplexed block data in the predetermined encryption unit and a communication unit transmits the data encrypted in the encryptor, wherein the receiving apparatus decodes the encrypted data transmitted from the transmission apparatus.

12 Claims, 10 Drawing Sheets

U.S. PATENT DOCUMENTS

| | | | | |
|---|---|---|---|---|
| 5,543,800 | A * | 8/1996 | Mills et al. | 342/197 |
| 5,757,915 | A * | 5/1998 | Aucsmith et al. | 713/187 |
| 5,930,808 | A * | 7/1999 | Yamanaka et al. | 715/205 |
| 6,201,970 | B1 * | 3/2001 | Suzuki et al. | 455/450 |
| 6,212,199 | B1 * | 4/2001 | Oxford | 370/466 |
| 6,580,671 | B1 * | 6/2003 | Otomo et al. | 369/47.15 |
| 6,587,948 | B1 * | 7/2003 | Inazawa et al. | 713/193 |
| 6,788,710 | B1 * | 9/2004 | Knutson et al. | 370/535 |
| 6,839,844 | B1 * | 1/2005 | Okano | 713/176 |
| 2002/0196760 | A1 * | 12/2002 | Malomsoky et al. | 370/338 |

FOREIGN PATENT DOCUMENTS

| | | |
|---|---|---|
| JP | 06-326880 | 11/1994 |
| JP | 07177102 A | 7/1995 |
| JP | 10303864 A | 11/1998 |
| JP | 11112597 A | 4/1999 |
| JP | 2000040298 A | 2/2000 |
| JP | 2000076790 A | 3/2000 |
| JP | 2000078172 A | 3/2000 |
| JP | 2000151538 A | 5/2000 |
| JP | 2000165376 A | 6/2000 |
| JP | 2000-295240 | 10/2000 |
| JP | 2001005499 A | 1/2001 |
| JP | 2001101788 A | 4/2001 |
| WO | 99/22372 | 5/1999 |

OTHER PUBLICATIONS

XP001121596; "Media Oriented Synchronous Transfer—A Network Protocol for High Quality, Low Cost Transfer of Synchronous, Asynchronous, and Control Data on Fiber Optic"; PrePrints of Papers Presented at the AES Convention; vol. 4551, No. 4551; Sep. 1997; 8 Pages.

XP002213172; "5C Digital Transmission Content Protection White Paper" Jul. 14, 1998; Retrieved from the Internet: <URL:http://www.dtcp.com/data/wp_spec.pdf>; 8 Pages.

XP000360962; A. Straub; "Digitale Audio-Verarbeitung"; Radio Fernsehen Elektronick, Veb Verlag Technik; Berlin, DE; vol. 42, No. 1, 1993; pp. 13-16.

XP00121034; Thiel C. et al.; Media Oriented Systems Transport (MOST) Standard for MultiMedia Networking in Vehicle Environment; VDI Berichte, Duesseldorf, DE; No. 1415, 1998, pp. 819-834.

XP009003238; Koenig R. et al.; Media Oriented Systems Transport (MOST)—Standard for MultiMedia Networking in Vehicle Environment; Munchen, DE; vol. 41, No. 5, Oct. 1999; pp. 36-42.

XP010346680; Schopp H. et al.; "Video and Audio Applications in Vehicles Enabled by Networked Systems"; Consumer Electronics, 1999; International Conference on Los Angeles, CA, USA Jun. 22-24, 1999, Piscataway, NJ, USA; Jun. 22, 1999, pp. 218-219.

XP001004842; Tappe R. et al.; "Most-Media Oriented Systems Transport"; Munchen, DE; vol. 49, No. 14; Jul. 11, 2000, pp. 54-59.

Communication Pursuant to Article 94(3) EPC, Application No. 02250216.5, Jan. 27, 2011, 6 pages.

XP040395208; Digital Transmission Content Protection Specification vol. 1 (Informational Version), Hitachi, Ltd. Intel Corporation, Jul. 25, 2000, 82 pages.

* cited by examiner

| | Data contents | Number of bits |
|---|---|---|
| copyright protect information 1 (copy control information) | copy permission information | 2 |
| | copy times information | 3 |
| | copy quality information | 2 |
| | audio transaction information | 1 |
| copyright protect information 2 (ISRC information) | ISRC status information | 3 |
| | ISRC number information | 5 |
| copyright protect information 3 (ISRC information) | ISRC data information | 8 |

Fig.4

|  | Data contents | Number of bits |
|---|---|---|
| AUX 1 | quantization word length 1 | 4 |
|  | quantization word length 2 | 4 |
| AUX 2 | sampling frequency 1 | 4 |
|  | sampling frequency 2 | 4 |
| AUX 3 | channel assignment information | 5 |
|  | Reserved | 3 |
| AUX 4 | Reserved | 8 |
| AUX 5 | Reserved | 8 |

Fig.5

| | CH1 | CH2 | CH3 | CH4 | CH5 | CH6 |
|---|---|---|---|---|---|---|
| 00000 | C | | | | | |
| 00001 | L | R | | | | |
| 00010 | Lf | Rf | S | | | |
| 00011 | Lf | Rf | Ls | Rs | | |
| 00100 | Lf | Rf | Lfe | | | |
| 00101 | Lf | Rf | Lfe | S | | |
| 00110 | Lf | Rf | Lfe | Ls | Rs | |
| 00111 | Lf | Rf | C | | | |
| 01000 | Lf | Rf | C | S | | |
| 01001 | Lf | Rf | C | Ls | Rs | |
| 01010 | Lf | Rf | C | Lfe | | |
| 01011 | Lf | Rf | C | Lfe | S | |
| 01100 | Lf | Rf | C | Lfe | Ls | Rs |
| 01101 | Lf | Rf | C | S | | |
| 01110 | Lf | Rf | C | Ls | Rs | |
| 01111 | Lf | Rf | C | Lfe | | |
| 10000 | Lf | Rf | C | Lfe | S | |
| 10001 | Lf | Rf | C | Lfe | Ls | Rs |
| 10010 | Lf | Rf | Ls | Rs | Lfe | |
| 10011 | Lf | Rf | Ls | Rs | C | |
| 10100 | Lf | Rf | Ls | Rs | C | Lfe |

Channel group 1 | Channel group 2

16-bit sample

Fig. 7 (b)

20-bit sample

Fig. 7 (c)

24-bit sample

TRANSMISSION SYSTEM WITH APPARATUS FOR TRANSMITTING AND RECEIVING AUDIO DATA AUXILIARY DATA

FIELD OF THE INVENTION

The present invention relates to a transmission system for transmitting real time data, typified by digital audio data.

BACKGROUND OF THE INVENTION

As an example of methods for transmitting data recorded on a conventional compact disc (CD) or the like, there is a method called MOST (Media Oriented Synchronous Transfer). (Reference: Patrick Heck et al., "Media Oriented Synchronous Transfer—A Network Protocol for High Quality, Low Cost Transfer of Synchronous, Asynchronous, and Control Data on Fiber Optics", Presented AES 103rd, 1997 September, Preprint 4551.)

Figure 11:
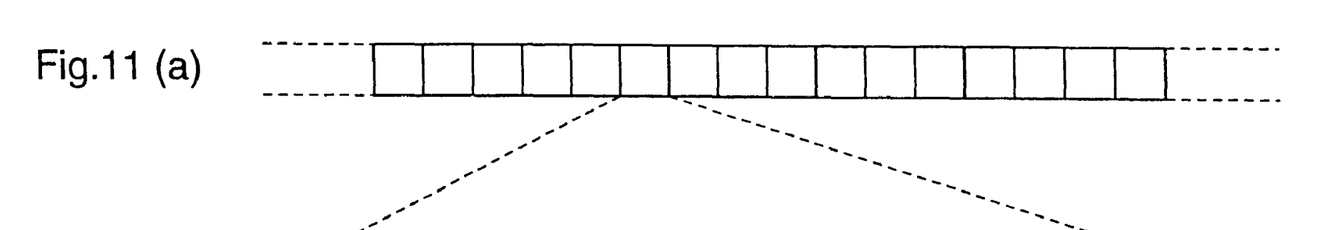
FIGS. 11(a) and 11(b) are diagrams for illustrating a data structure of a frame included in data to be transmitted.

Hereinafter, the conventional data transmission method according to the MOST method will be described with reference to FIGS. 11 and 12.

FIGS. 11(a) and 11(b) are diagrams illustrating a data structure of a frame included in data to be transmitted.

As shown in FIG. 11(a), according to the conventional transmission method, data are transmitted in frames, which are transmitted at 44.1 kHz, i.e., once every 22.67 msec. The data length of one frame is 512 bits. As shown in FIG. 11(b), the frame is composed of a preamble 501, a boundary descriptor 502, a synchronous channel area 503, an asynchronous channel area 504, a control frame 505, a frame control data 506 and a parity 507. Here, the cycle of the frame is not limited to 44.1 kHz but it may be 48 kHz.

Here, the preamble 501, the boundary descriptor 502 and the synchronous channel area 503 in the frame are described, while the asynchronous channel area 504, the control frame 505, the frame control data 506 and the parity 507 will not be described here because they are not directly associated with the present invention.

The preamble 501 is 4-bit data having a determined pattern, which is used by a transmission apparatus and a receiving apparatus performing transmission to detect boundaries of frames. The boundary descriptor 502 is 4-bit data, which indicates how many pieces of 4-byte block data constitutes the synchronous channel area 503 and is used to show the boundary between the synchronous channel area 503 and the asynchronous channel area 504.

The synchronous channel area 503 is data having the length of 0~480 bits, which length is decided by the boundary descriptor 502. The synchronous channel area 503 is used for transmission of real time data such as audio. Here, the real time data is data each having time restriction and transmission of the real time data requires that the transmission delay time should be definable.

The data constituting the synchronous channel area 503 are allocated to the transmission apparatus and the receiving apparatus in byte units as time slots. That is, the data constituting the synchronous channel area 503 can use maximum 60 time slots as the synchronous channel area. The time slots which are to be used for transmission are previously allocated to the transmission apparatus and the receiving apparatus, and a group of time slots used for one transmission is defined as a logical channel. The transmission apparatus transmits data using the allocated time slots, and the receiving apparatus receives data of the allocated time slots. Using one time slot in the MOST method corresponds to transmission of data at a transmission rate of 352.8 kbps. To be more specific, data of a compact disk (CD) having a transmission rate of 1.4112 Mbps can be transmitted by using 4 time slots of the synchronous channel area 503.

Figure 12:
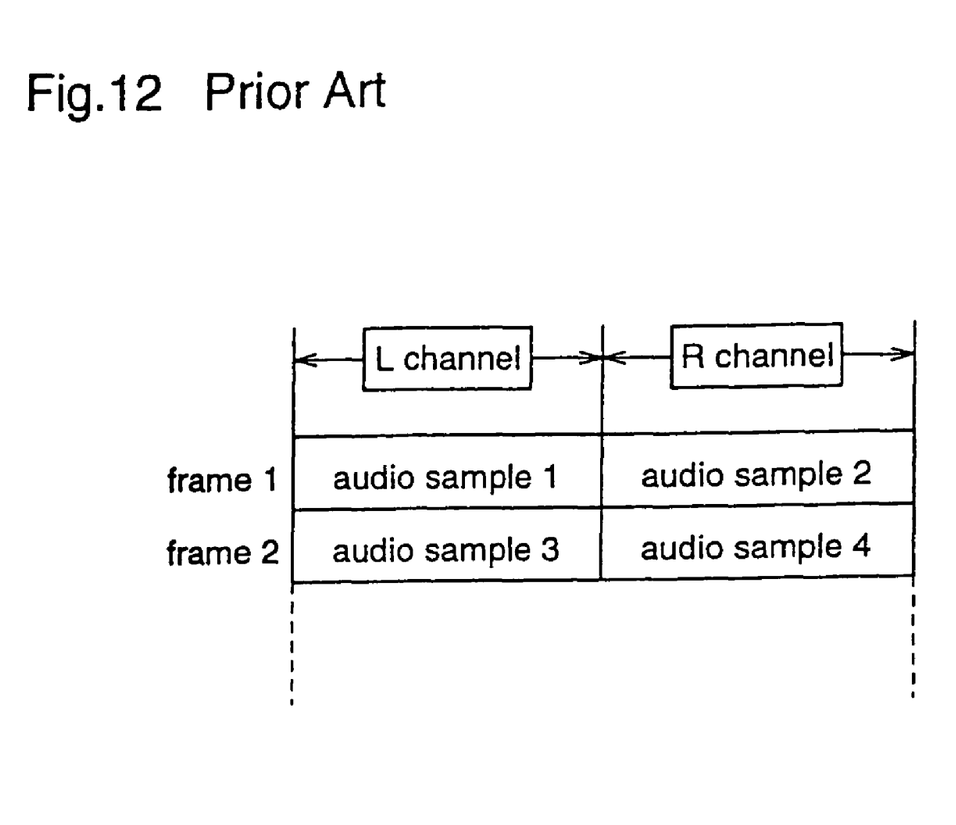
FIG. 12 is a diagram for explaining a data transmission method according to a conventional transmission system.

FIG. 12 is a diagram for explaining a method for transmitting digital audio data using the conventional synchronous channel.

In this figure, contents of time slots in respective frames 1 and 2 which are used by L and R channels for transmitting digital audio data are shown. 16-bit audio samples 1 and 3 in the frames 1 and 2 are transmitted by the L channel and 16-bit audio samples 2 and 4 are transmitted by the R channel, respectively.

According to the conventional transmission method, a method for transmitting 2-channel audio data which are recorded on a CD or the like is determined, while a data transmission method for transmitting multi-channel audio data which are recorded on a DVD-Video or a DVD-Audio, or audio data having a higher sampling frequency or a longer quantization word length is not determined and thus the multi-channel data cannot be transmitted.

In addition, according to the conventional transmission method, when data are encrypted for copyright protection typified by DTCP (Digital Transmission Content Protection Specification), there are following two problems. The first one is that when commonly used encryption in 8-byte units is performed in the transmission apparatus, data of each frame according to the conventional transmission method is not always a multiple of 8 bytes and thus the encryption is not completed within the frame. The second problem is that although copyright protect information is supposed to be transmitted according to the DTCP, its transmission method is not determined in the conventional transmission method.

SUMMARY OF THE INVENTION

The present invention has for its object to provide a transmission system which can transmit multi-channel audio data in a DVD-Audio or the like efficiently on a transmission line using a fixed length frame according to the MOST method or the like, and implement copyright protection of audio data.

Other objects and advantages of the present invention will become apparent from the detailed description and specific embodiments described are provided only for illustration since various additions and modifications within the spirit and scope of the invention will be apparent to those of skill in the art from the detailed description.

According to a 1st aspect of the present invention, there is provided a transmission system comprising: a transmission apparatus for transmitting audio data of multi channels and auxiliary data required for playback of the audio data; and a receiving apparatus for receiving the audio data and the auxiliary data which are transmitted by the transmission apparatus, in which the auxiliary data include channel assignment information of the audio data.

According to a 2nd aspect of the present invention, in the transmission system of the 1st aspect, the auxiliary data further includes sampling frequency information.

According to a 3rd aspect of the present invention, in the transmission system of the 1st aspect, the auxiliary data further includes quantization bit information.

According to a 4th aspect of the present invention, in the transmission system of the 1st aspect, the channel assignment information of the audio data is based on DVD-Audio standards.

According to a 5th aspect of the present invention, in the transmission system of the 1st aspect, the transmission apparatus comprises a multiplexer for multiplexing the audio data and the auxiliary data to create multiplexed data, and the receiving apparatus comprises a demultiplexer for receiving the multiplexed data transmitted from the transmission apparatus, and demultiplexing the data into audio data and auxiliary data.

According to a 6th aspect of the present invention, in the transmission system of the 1st aspect, when transmitting audio data having various sampling frequencies to the receiving apparatus, the transmission apparatus multiplexes and transmits first-generated audio data first.

According to a 7th aspect of the present invention, in the transmission system of the 1st aspect, according to a method for transmitting the audio data and the auxiliary data, the data are time divided into transmission frames, and as for transmission of the audio data, prescribed bits are assigned to each transmission frame.

According to an 8th aspect of the present invention, in the transmission system of the 1st aspect, a method for transmitting the audio data and the auxiliary data complies with a MOST method.

According to a 9th aspect of the present invention, there is provided a transmission system comprising a transmission apparatus for transmitting digital data and auxiliary data required for playback of the digital data; and a receiving apparatus for receiving the digital data and the auxiliary data which are transmitted from the transmission apparatus, in which the transmission apparatus comprises: a multiplexer for multiplexing the digital data and the auxiliary data to create block data which is composed of n frames as a multiple of a predetermined encryption unit; and an encryptor for encrypting the block data in the predetermined encryption unit to create encrypted data, and the receiving apparatus comprises: a decoder for decoding the encrypted data transmitted from the transmission apparatus; and a demultiplexer for demultiplexing the block data decoded by the decoder into digital data and auxiliary data.

According to a 10th aspect of the present invention, in the transmission system of the 9th aspect, the predetermined encryption unit is 8 bytes.

According to an 11th aspect of the present invention, in the transmission system of the 9th aspect, the multiplexer multiplexes copyright protect information as information for protecting copyright concerning the digital data, in plural frames within the block data.

According to a 12th aspect of the present invention, in the transmission system of the 11th aspect, the copyright protection information includes at least copy permission information indicating whether copying of the digital data is permitted or not, in a first one of the frames in which the information is multiplexed.

According to a 13th aspect of the present invention, in the transmission system of the 11th aspect, the copyright protect information includes copy permission information indicating whether copying of the digital data is permitted or not, copy times information indicating how many times of copying is permitted when the copying is permitted, copy quality information indicating the quality of copying when the copying is permitted, and audio transaction information indicating whether special audio access control is performed or not.

According to a 14th aspect of the present invention, in the transmission system of the 9th aspect, according to a method for transmitting the digital data and the auxiliary data, the data are time divided into transmission frames, and as for transmission of the digital data and the auxiliary data, prescribed bits are assigned to each transmission frame.

According to a 15th aspect of the present invention, in the transmission system of the 9th aspect, a method for transmitting the digital data and the auxiliary data complies with a MOST method.

According to a 16th aspect of the present invention, there is provided a transmission apparatus which receives audio data and copyright protect information that is information for protecting copyright of the audio data, and generates a periodic signal with eight transmission frames as one cycle, comprising: a first multiplexer means for multiplexing the copyright protect information in synchronization with the periodic signal; an encryptor means for performing encryption in synchronization with the periodic signal; and a second multiplexer means for multiplexing periodic information indicating information of the periodic signal in synchronization with the periodic signal.

According to a 17th aspect of the present invention, in the transmission apparatus of the 16th aspect, a method for transmitting the data complies with a MOST method.

According to an 18th aspect of the present invention, there is provided a receiving apparatus which receives audio data and copyright protect information, from a transmission apparatus which receives the audio data and the copyright protect information that is information for protecting copyright of the audio data and generates a periodic signal with eight transmission frames as one cycle, comprising: a first demultiplexer means for generating a periodic signal on the basis of periodic information as information of the periodic signal detected from the received data; a decoder means for performing decoding in synchronization with the periodic signal; and a second demultiplexer means for demultiplexing the copyright protect information in synchronization with the periodic signal.

According to a 19th aspect of the present invention, in the receiving apparatus of the 18th aspect, a method for transmitting the data complies with a MOST method.

DETAILED DESCRIPTION OF THE PREFERRED EMBODIMENTS

Hereinafter, a first embodiment of the present invention will be described with reference to FIGS. 1 to 10.

Figure 1:
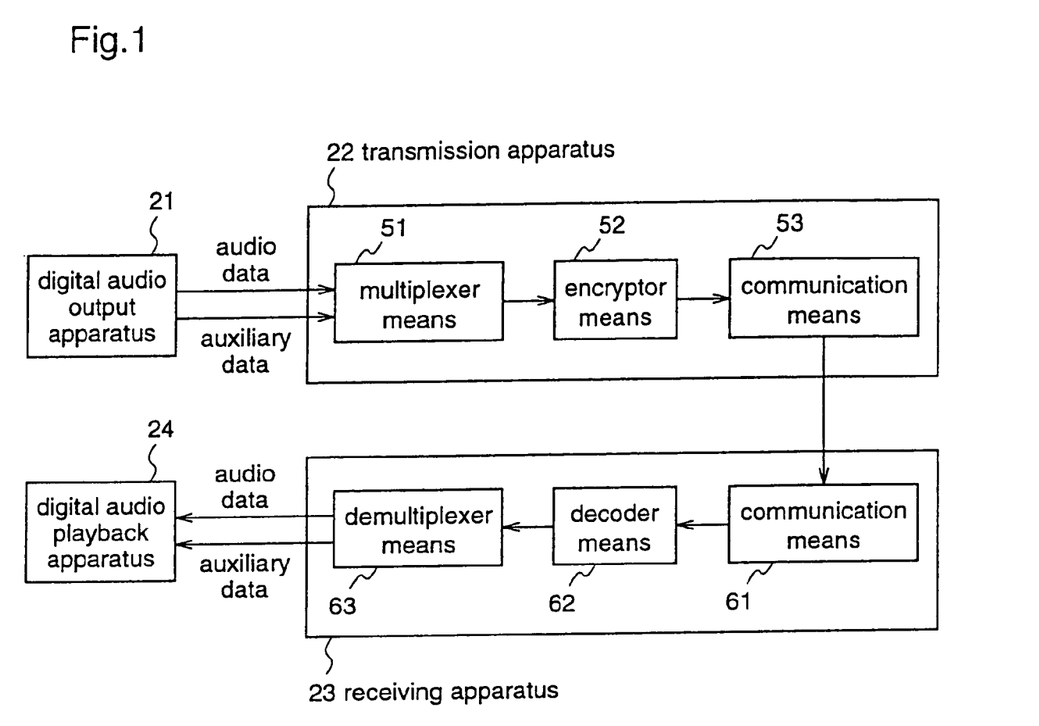
FIG. 1 is a block diagram illustrating a structure of a transmission system according to a first embodiment of the present invention.

FIG. 1 is a block diagram illustrating a structure of a transmission system according to the present invention.

In FIG. 1, reference numeral 21 denotes a digital audio output apparatus, numeral 22 denotes a transmission apparatus, numeral 23 denotes a receiving apparatus, and numeral 24 denotes a digital audio playback apparatus. Numeral 51 denotes a multiplexer means. Numeral 52 denotes an encryptor means. Numeral 53 denotes a communication means. Numeral 61 denotes a communication means. Numeral 62 denotes a decoder means. Numeral 63 denotes a demultiplexer means.

The digital audio output apparatus 21 is an apparatus for outputting digital audio data, typified by a drive of a DVD-Audio, and it outputs digital audio data and related auxiliary data which are recorded on a disc.

The multiplexer means 51 multiplexes the audio data and the auxiliary data which are outputted by the digital audio output apparatus 21, and outputs multiplexed data. The encryptor means 52 carries out an encryption process in predetermined data units (this data unit is defined as an encryption unit) according to the conventional encryption method and, when the encryption unit is 8 bytes, encrypts digital data as an encryption target every 8 bytes.

The communication means 53 receives the data encrypted by the encryptor means 52, and transmits the encrypted data to the communication means 61 on the receiving apparatus 23 side. The communication means 61 receives the signal transmitted by the communication means 53 on the transmission apparatus 22 side, and outputs the signal to the decoder means 62. The communication means 53 and the communication means 61 transmit the data using the synchronous channel area according to the MOST method as described in the prior art.

The decoder means 62 receives the data outputted from the communication means 61, and carries out a decoding process in encryption units (=8 bytes). When a synchronization between the transmission apparatus 22 and the receiving apparatus 23 cannot be obtained, and when the data of the encryption unit at the encryption and the data of the encryption unit at the decoding deviate from each other or when part of the data of the encryption unit lacks, the encrypted data cannot be decoded by the decoder means 62 correctly. That is, the decoder means 62 should insure the correct synchronization of the data of the encryption unit selected by the encryptor means 52 and recognize the data. The demultiplexer means 63 receives the data outputted from the decoder means 62, demultiplexes the data into audio data and auxiliary data, and outputs the demultiplexed data.

The digital audio playback apparatus 24 is typically an apparatus that is constituted by a digital amplifier and a speaker, and it receives the audio data and the auxiliary data outputted from the receiving apparatus 23, plays back the audio data, and outputs audible audio.

Figure 2:
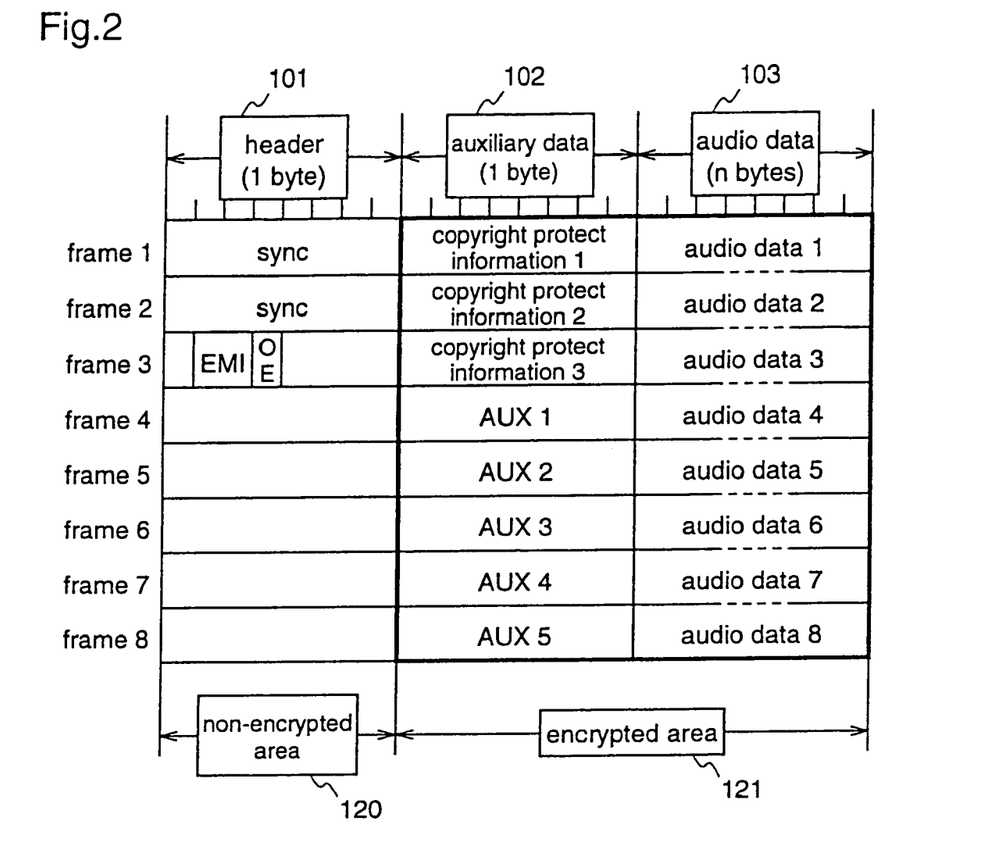
FIG. 2 is a diagram for explaining block data which are transmitted by the transmission system of the first embodiment.

FIG. 2 is a diagram for explaining block data to be transmitted from the transmission apparatus 22 to the receiving apparatus 23 according to the first embodiment.

As shown in FIG. 2, one block is composed of 8 frames, i.e., frames 1 to 8, and in each of the frames 1 to 8, the 1st byte is a header 101, the 2nd byte is auxiliary data 102, and "n" bytes from the 3rd byte is audio data 103. Each of the frames 1 to 8 corresponds to a frame of a prescribed cycle (a frame every 44.1 kHz or 48 kHz in the MOST method) on a transmission line. Each of the frames 1 to 8 include data of time slots which are used by the communication means 53 of the transmission apparatus 22 for transmission of data.

Here, the time slots used by the communication means 53 are reserved before data transmission, and information indicating which time slot is to be used is shared by the communication means 53 and the communication means 61. Further, for the time slots used by the communication means 53, 2 bytes composed of the header 101 and the auxiliary data 102, as well as the audio data 103 are reserved. For example, when the audio data 103 transmitted by the respective frames 1 to 8 is 30 bytes, 32-byte time slots are reserved.

The frames 1 and 2 in the block data are sync bits, each frame entirely indicating a synchronous pattern. The 2nd and 3rd bits of the frame 3 are an EMI (Encryption Mode Indicator) and the 4th bit is an OE (Odd/Even), and the EMI and the OE are bits defined in the DTCP. The above-mentioned sync, EMI and OE are multiplexed in a non-encrypted area 120 that is not encrypted. The sync is data used for finding the head of the block data, and the length or pattern of the sync is not limited to that shown here but it may be arbitrarily set.

The auxiliary data 102 includes copyright protect information indicating a copyright holder of the audio data 103 or whether copying of the audio data is permitted or not, and AUX data (auxiliary information) required for playback of the audio data, such as the sampling frequency, quantization word length and channel assignment information of the audio data 103.

In FIG. 2, it is assumed as an example that the 2nd bytes of the frames 1 to 3 are copyright protect information and the 2nd bytes of the frames 4 to 8 are AUX data, while of course arbitrary data can be transmitted using eight bytes.

The copyright protect information of the DVD-Audio is described in "DVD Specifications for Read-Only Part4. Audio Specification Version 1.2". The copyright protect information is composed of 3-byte data, and consists of copy permission information (audio_copy_permission), information of times of copying (audio_copy_number), copy quality information (audio_quality), audio transaction information (audio_transaction), ISRC status information (ISRC_Status), ISRC number information (UPC_EAN_ISRC_number), and ISRC data information (UPC_EAN_ISRC_data).

Figure 3:
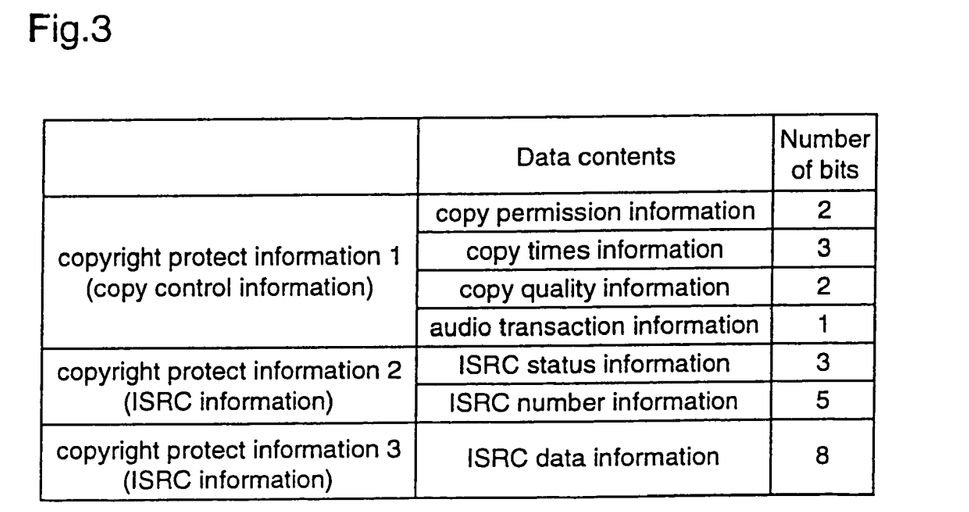
FIG. 3 is a diagram for explaining copyright protect information included in the block data of FIG. 2.

FIG. 3 shows an example of arrangement of respective information of the copyright protect information.

Copyright protect information 1 is copy control information, and it consists of 2-bit copy permission information, 3-bit copying times information, 2-bit copy quality information, and 1-bit audio transaction information.

The copy permission information is information indicating whether copying is permitted or not. To be more specific, "00" indicates that copying is permitted, "10" indicates that copying is permitted by the number of times indicated by the copying times information, and "11" indicates that copying is not permitted.

The copying times information is information indicating how many times of copying is permitted when the copying is permitted. "000" indicates copying is permitted once, "001" indicates twice, "010" indicates 4 times, "011" indicates 6 times, "100" indicates 8 times, "101" indicates 10 times, and "111" indicates that the number of times of copying is unlimited.

The copy quality information is information indicating the audio quality of copying when the copying is permitted. "00" indicates that the number of channels is two or less, the sampling frequency is 48 kHz or less, and the quantization word length is 16 bits or less. "01" indicates that the number of channels is two or less and there is no restriction on the sampling frequency or the quantization word length. "10" indicates that there is no restriction on the number of channels, the sampling frequency, or the quantization word length.

The audio transaction information is a flag indicating whether specific audio access control is performed or not. "0" indicates that no access control is performed and "1" indicates that the access control is not reserved for the future in the present circumstances.

Copyright protect information 2 is ISRC information (music information), and consists of 3-bit ISRC status information and 5-bit ISRC number information. Copyright protect information 3 is ISRC information and consists of 8-bit ISRC data information.

The ISRC status information is status information of an ISRC, which is used to find a position at which the ISRC information is changed. "001" indicates the start position of music, "010" indicates an intermediate position, i.e., indicates that there is no change in the ISRC information, and "100" indicates the end position.

The ISRC number information indicates a number for identifying the music.

It is desirable that the copy permission information, the copying times information, the copy quality information, and the audio transaction information be multiplexed at an earlier position in the auxiliary data 102. Thereby, it is possible to decide earlier how to process the audio information on the receiving end.

The arrangement of the respective information may be an arbitrary arrangement as long as it is decided between the transmission apparatus and the receiving apparatus. Further, the copyright protect information is not limited to the above-mentioned type but arbitrary information decided in a recording medium or a broadcasting system can be employed.

Figure 4:
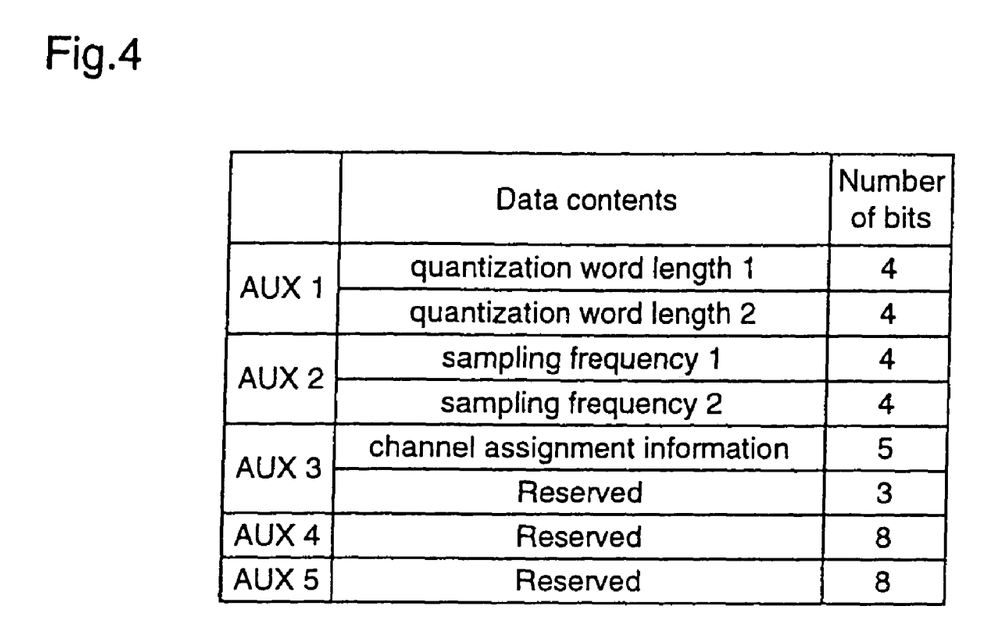
FIG. 4 is a diagram for explaining AUX data included in the block data of FIG. 2.

Next, an example of the AUX data arrangement is shown in FIG. 4.

AUX 1 consists of a quantization word length 1 of 4 bits and a quantization word length 2 of 4 bits. The quantization word length 1 is data indicating the quantization word length of Channel group 1 and the quantization word length 2 is data indicating the quantization word length of Channel group 2, and "0" indicates 16 bits, "1" indicates 20 bits, and "3" indicates 24 bits, respectively. AUX 2 consists of a sampling frequency 1 of 4 bits and a sampling frequency 2 of 4 bits. The sampling frequency 1 is data indicating the sampling frequency of Channel group 1 and the sampling frequency 2 is data indicating the sampling frequency of Channel group 2, and "0" indicates 48 kHz, "1" indicates 96 kHz, "2" indicates 192 kHz, "4" indicates 44.1 kHz, "5" indicates 88.2 kHz, and "6" indicates 176 kHz, respectively. Further, AUX 3 consists of channel assignment information of 5 bits and a reserved area of 3 bits. The channel assignment information indicates channel assignment of multi-channel audio data 103.

Figure 5:
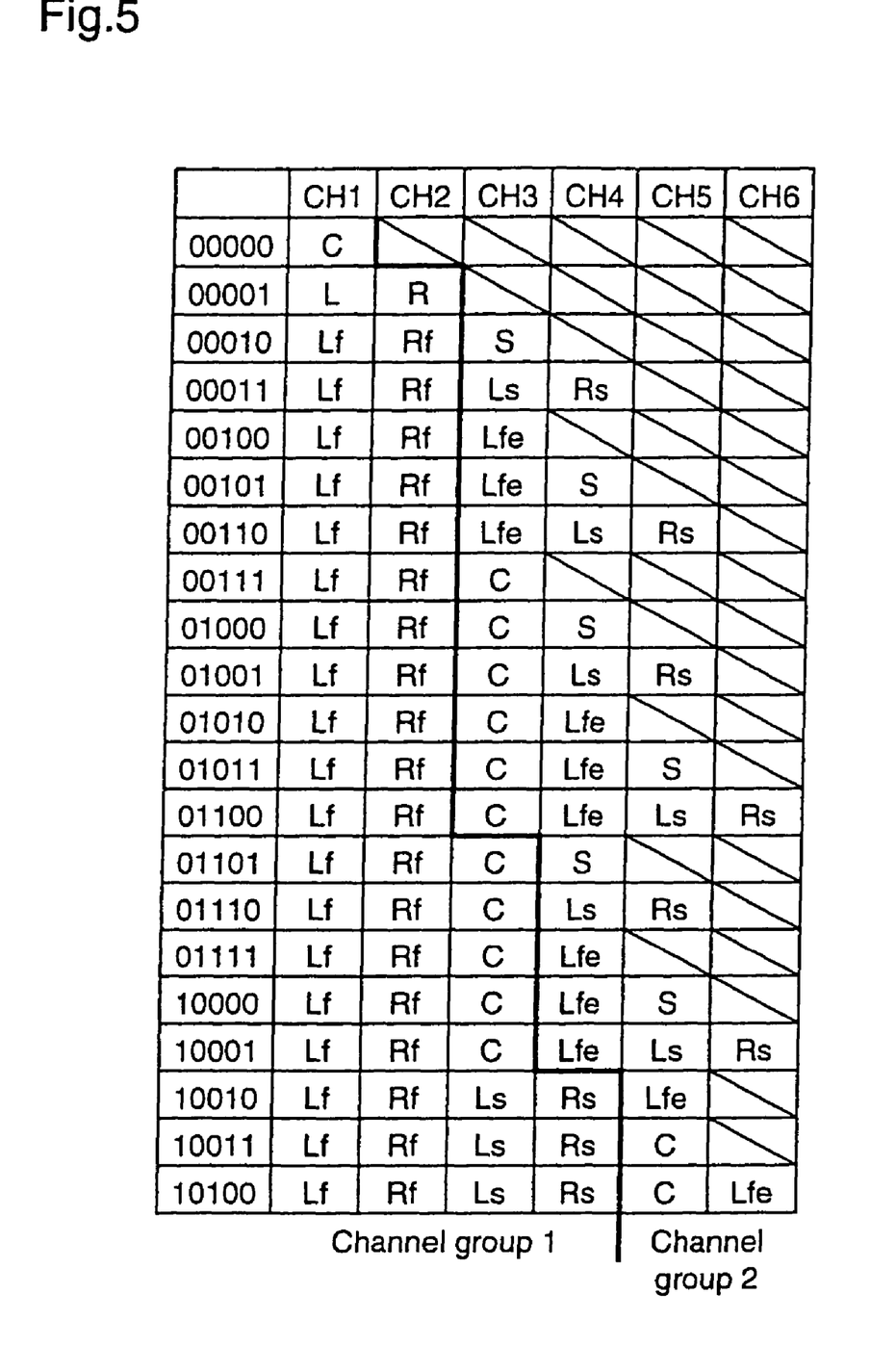
FIG. 5 is a diagram for explaining channel assignment information in the AUX data of FIG. 4.

FIG. 5 is a diagram for explaining the channel assignment information of multi-channel audio data in the DVD-Audio. (Reference: "Standardization of DVD-Audio" by Shinbo et al. in Matsushita Technical Journal Vol. 45, No. 6, 1999 December) FIG. 6 is a diagram for explaining a digital audio data transmission method utilizing a synchronous channel.

In FIG. 5, C denotes a center channel, L and R denote left and right channels, Lf and Rf denote left and right front channels, Ls and Rs denote left and right rear channels or surround channels, Lfe denotes a low frequency effects channel, and S denotes a surround channel, respectively.

As shown in FIG. 5, the value of the channel assignment information can specify multi-channel audio data which is transmitted to each of channels CH1 to CH6, and the channel group 1 or 2 to which each data belongs.

Figure 6:
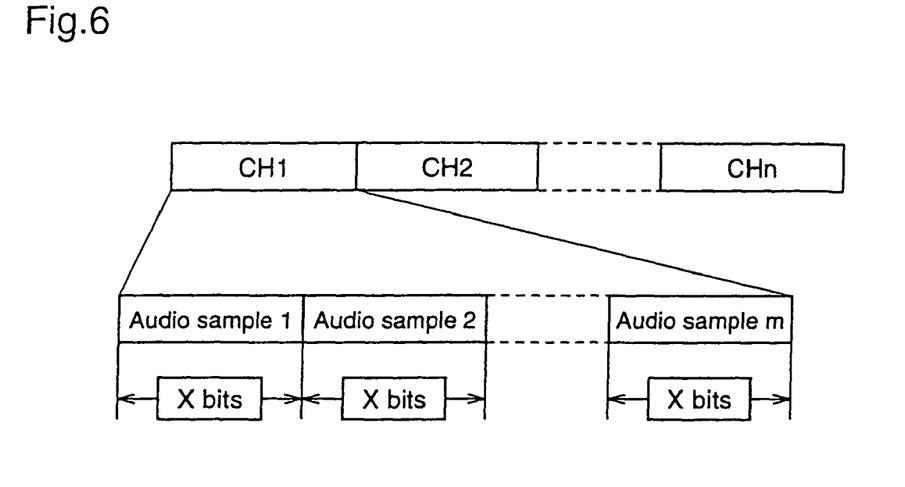
FIG. 6 is a diagram for explaining a data transmission method by the transmission system of the first embodiment.
Figure 7:
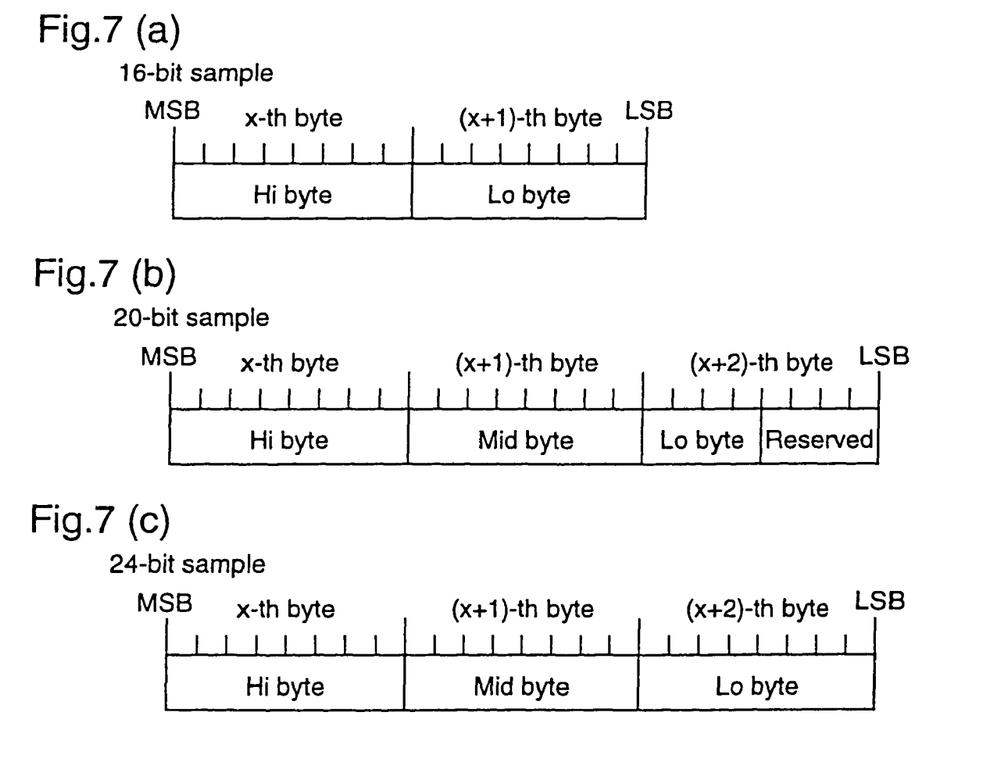
FIGS. 7(a) to 7(c) are diagrams for explaining structures of audio samples at respective quantization word lengths.

The audio data 103 in the block data is transmitted according to the value of the channel assignment information, with the respective audio samples of channels CH1 to CHn being arranged successively as shown in FIG. 6. Here, the value of "n" depends on the value of the channel assignment information. Further, the respective audio data 103 of CHx consists of "m" audio samples depending on the value of the sampling frequency of its channel group. For example, when the frequency band of the transmission line is 48 kHz, the audio data 103 belongs to the channel group 1, and the sampling frequency 1 is 96 kHz, the audio data consists of two audio samples. When the sampling frequency is 192 kHz, the audio data consists of four audio samples. The number of bits X of each audio sample corresponds to the quantization word length of the channel group of each audio sample.

FIGS. 7(a) to 7(c) are diagrams for explaining structures of audio samples at respective quantization word lengths.

Initially, it is assumed that an audio sample is mapped successively from a higher byte (x-th byte) to a lower byte ((x+n)-th byte). For example, in the case of an audio sample of 16-bit quantization word length as shown in FIG. 7(a), 8 bits are mapped to the x-th higher byte (Hi byte) and 8 bits are mapped to the (x+1)-th lower byte (Lo byte), whereby the audio sample is transmitted using the time slot of 2 bytes in total.

In the case of an audio sample of 20-bit quantization word length as shown in FIG. 7(b), 8 bits are mapped to the x-th Hi byte, 8 bits are mapped to the (x+1)-th middle byte (Mid byte), 4 bits are mapped to the (x+2)-th Lo byte, and remaining 4 bits are reserved in an empty state. Thus, in the case of the 20-bit audio sample, the audio sample is transmitted using the time slot of 3 bytes in total.

In the case of an audio sample of 24-bit quantization word length as shown in FIG. 7(c), 8 bits are mapped to the x-th Hi byte, 8 bits are mapped to the (x+1)-th Mid byte, and 8 bits are mapped to the (x+2) Lo byte, whereby the audio sample is transmitted using the time slot of 3 bytes in total.

As described above, the audio samples of respective quantization word lengths can be transmitted from an MSB (Most Significant Bit) first successively in the following order: Hi byte, Mid byte, and Lo byte. However, the transmission order is not limited to this but the data may be transmitted from a LSB (Least Significant Bit) first successively in the reverse order. Further, the audio sample may be mapped to any bit positions within the constituting bytes. In FIG. 7(b), excess bits in the (x+2)-th byte are made blank, while the blank can be eliminated by mapping two of 20-bit samples to 5 bytes.

Figure 8:
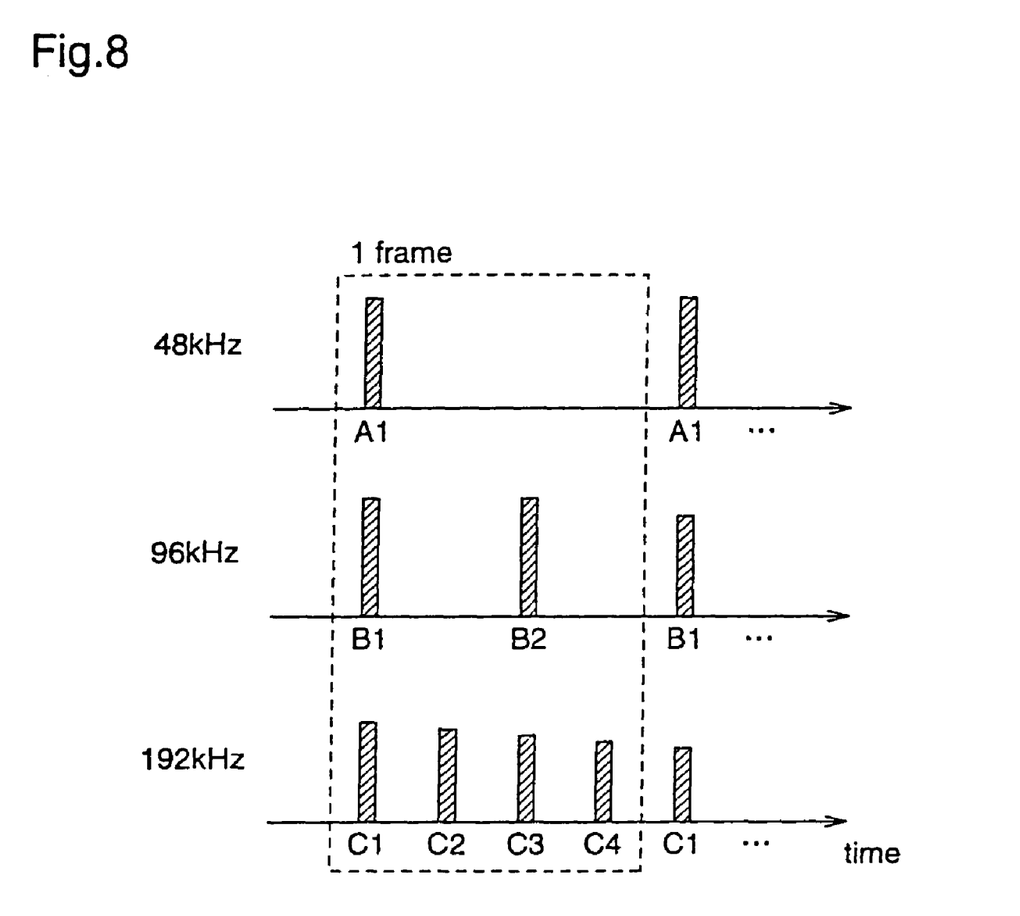
FIG. 8 is a diagram for explaining a method for transmitting data that is composed of frames of various cycles.

FIG. 8 is a diagram for explaining a method for transmitting data that is composed of frames of various cycles. In FIG. 8, the abscissa represents time when audio samples of each cycle (48 kHz, 96 kHz, 192 kHz) are transmitted.

According to the MOST method, when the sampling frequency of data to be transmitted is 48 kHz, one audio sample (A1) is transmitted per one frame. When the sampling frequency is 96 kHz, two audio samples (B1, B2) are transmitted per one frame. When the sampling frequency is 192 kHz, four audio samples (C1, C2, C3, C4) are transmitted per one frame.

For example, when the audio sample of 48-kHz sampling frequency, the audio sample of 96 kHz sampling frequency and the audio sample of 192 kHz sampling frequency are mixed and transmitted, the normalization is performed such that the audio sample of each channel is located at the top position in the frame and the audio samples are transmitted successively from earlier-generated audio samples. To be more specific, in the above-mentioned example, the audio samples A1, B1 and C1 are transmitted at the first transmission, the audio sample C2 is transmitted at the second transmission, the audio samples B2 and C3 are transmitted at the third transmission, and the audio sample C4 is transmitted at the fourth transmission.

Next, another transmission system will be described with reference to FIG. 9.

Figure 9:
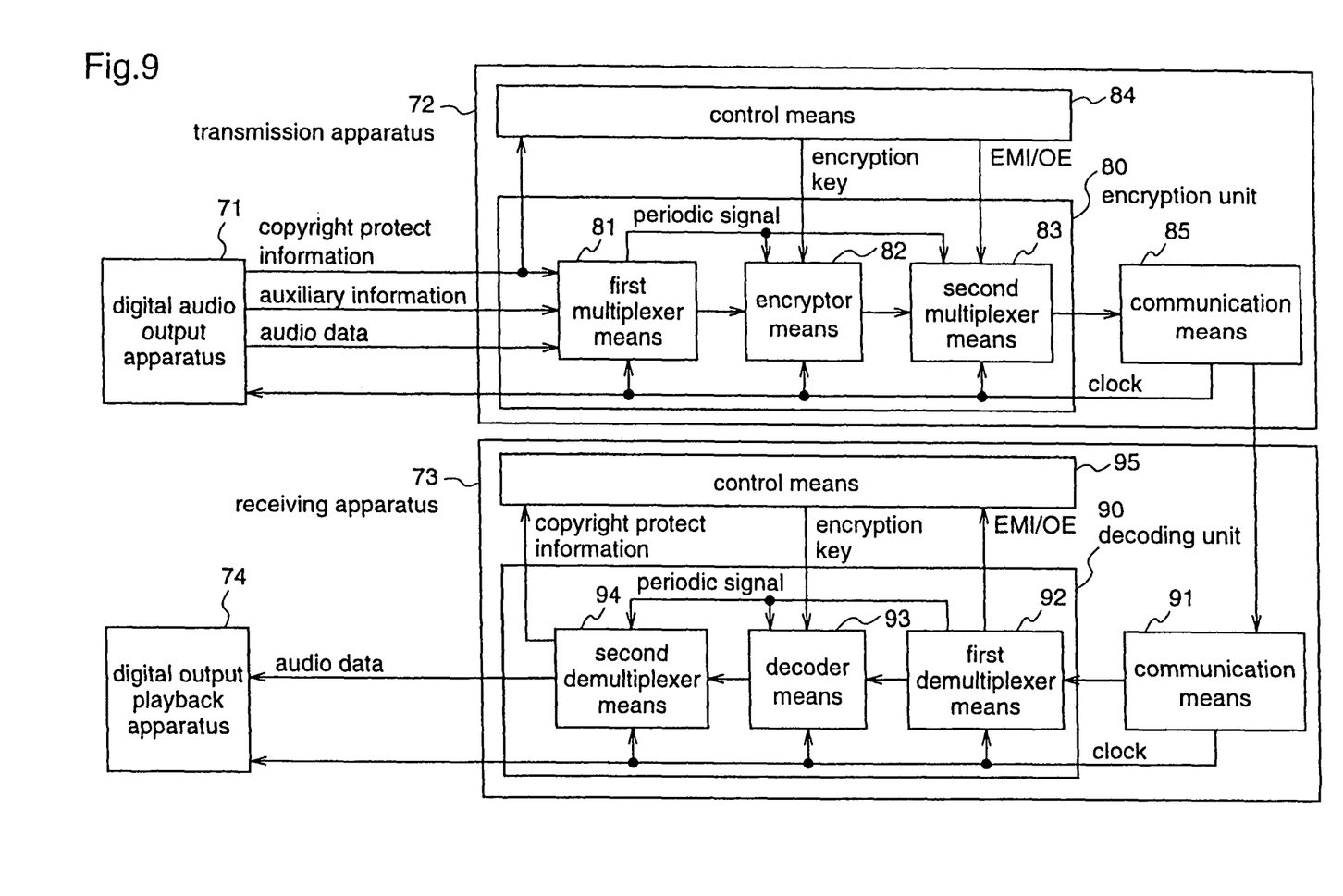
FIG. 9 is a block diagram illustrating a structure of another transmission system which is different from that shown in FIG. 1.

In FIG. 9, numeral 71 denotes a digital audio output apparatus, numeral 72 denotes a transmission apparatus, numeral 73 denotes a receiving apparatus, and numeral 74 denotes a digital audio playback apparatus. Numeral 80 denotes an encryption unit. Numeral 81 denotes a first multiplexer means. Numeral 82 denotes an encryptor means. Numeral 83 denotes a second multiplexer means. Numeral 84 denotes a control means. Numeral 85 denotes a communication means. Numeral 90 denotes a decoding unit. Numeral 91 denotes a communication means. Numeral 92 denotes a first demultiplexer means. Numeral 93 denotes a decoder means. Numeral 94 denotes a second demultiplexer means. Numeral 95 denotes a control means.

The digital audio output apparatus 71 receives a clock outputted by the communication means 85 and outputs audio data as well as outputs copyright protect information and auxiliary information concerning audio as auxiliary data, in synchronization with the clock.

The first multiplexer means 81 receives the audio data, the auxiliary information and the copyright protect information outputted from the digital audio output apparatus 71, multiplexes these data, and outputs multiplexed data. The encryptor means 82 receives the multiplexed data from the first multiplexer means 81, encrypts areas of audio data 103 and auxiliary data 102 on the basis of an encryption key (which will be described later) inputted from the control means 84, and outputs encrypted data. The second multiplexer means 83 receives the encrypted data from the encryptor means 82, receives an EMI and an OE (header information 101) from the control means 84, and multiplexed these data. The above-mentioned first multiplexer means 81, the encryptor means 82, and the second multiplexer means 83 are referred to as the encryption unit 80. Here, the first multiplexer means 81, the encryptor means 82, and the second multiplexer means 83 operate in synchronization with the same periodic signal. That is, each periodic signal indicates the cycle of a block and the same processes are carried out in the section of each periodic signal. For example, when the start position of the periodic signal is the start position of a block, the encryptor means 82 makes the start position of the periodic signal coincide with the start position of the encryption unit. Then, the second multiplexer means 83 multiplexes Sync data at the start position of the periodic signal. In addition, the cycle of the periodic signal depends on how many transmission frames constitutes one block, and for example when one block consists of eight transmission frames, the periodic signal is generated in synchronization with eight transmission frames. Here, the periodic signal may be generated by any apparatus, or supplied from outside.

The control means 84 is constituted by a CPU, and receives the copyright protect information outputted from the digital audio output apparatus 71, judges on the basis of the information whether the encryption is performed or not, and when performing the encryption outputs the encryption key to the encryptor means 82. The control means further outputs the EMI and the OE as information indicating how to perform the encryption, to the second multiplexer means 83.

The communication means 85 outputs the clock, which is synchronized with a transmission clock of the transmission line, to the digital audio output apparatus 71 as well as receives the multiplexed data from the second multiplexer means 83, and transmits the encrypted data to the communication means 91 on the receiving apparatus 73 side.

The communication means 91 outputs a clock to the digital audio playback apparatus 74, receives the encrypted data transmitted from the communication means 85 on the transmission apparatus 72 side, synchronizes the data with the clock, and transmits the data to the first demultiplexer means 92.

The first demultiplexer means 92 receives the data outputted from the communication means 91, demultiplexes the EMI and the OE from the received data, transmits the EMI and the OE to the control means 95, and transmits other data to the decoder means 93. The decoder means 93 receives the data outputted from the first demultiplexer means 92, receives an encryption key from the control means 95, and carries out the decoding process in encryption units. The second demultiplexer means 94 receives the data outputted from the decoder means 93, demultiplexes the data into audio data and copyright protect information, transmits the audio data to the digital audio playback apparatus 74, and transmits the copyright protect information to the control means 95. The above-mentioned first demultiplexer means 92, the decoder means 93 and the second demultiplexer means 94 are referred to as the decoding unit 90. Here, the first demultiplexer means 92, the decoder means 93, and the second demultiplexer means 94 operate in synchronization with the same periodic signal. This periodic signal is generated by seeing Sync data on the transmission line. For example, when the start position of the periodic signal is the start position of a block, the decoder means 93 makes the start position of the periodic signal coincide with the start position of the encryption unit, like in the case of the encryptor means 82.

The control means 95 is constituted by a CPU, and it receives the EMI and the OE from the data outputted by the communication means 91, and outputs the encryption key to the decoder means 93 on the basis of these information. The control means further receives the copyright protect information from the decoded data, and control processes, such as copying of audio data, on the basis of the information.

As described above, the transmission apparatus 72 transmits data in synchronization with the clock outputted from the communication means 85, whereby conversion of a clock of audio data is not required, the circuit scale can be reduced, and further deterioration of the audio quality can be prevented. The first multiplexer means 81, the encryptor means 82 and the second multiplexer means 83 may be constituted integrally as the encryption unit 80 by one semiconductor chip. Further, the encryption unit 80 and the communication means 85 may be constituted by one semiconductor chip. The first demultiplexer means 92, the decoder means 93, and the second demultiplexer means 94 may be constituted integrally as the decoding unit 90 by one semiconductor chip. Further, the decoding unit 90 and the communication means 91 may be constituted by one semiconductor chip.

Here, the clocks of the transmission apparatus 72 and the receiving apparatus 73 are supplied through the transmission line, while when any apparatus is a clock source of the transmission line, it supplies the clock to the transmission line.

While here the case where the start position of the periodic signal is made coincide with the start position of the block has been described, it is needless to say that as long as positions of the periodic signal and the block or the periodic signal and the encryption unit are synchronized with each other, any positional relationship is possible.

As described above, according to the transmission system of the first embodiment, the transmission method for transmitting the channel assignment information, the sampling frequency information and the quantization word length information of multi-channel audio data is decided, whereby transmission of the multi-channel audio data, which has not been performed conventionally, is enabled. Since the header information is sent block by block at the transmission of the multi-channel audio data, efficient data transmission at smaller bands can be realized, with relative to the prior art transmission system by which the header information is transmitted frame by frame.

Further, according to the transmission system of the first embodiment, when multi-channel audio data of the DVD-Audio or the like is transmitted, the copyright protect information can be multi-transmitted at smaller bands. Further, since one block is composed of eight frames and the encryption in eight byte units is carried out block by block, the encryption can be performed up to the last byte, regardless of the length of the audio data 103.

The transmission order of audio samples is decided such that first-generated audio samples are transmitted first, whereby the amounts of memory required for waiting for timing of transmission/receiving of data, which are necessary on the transmission end and the receiving end, can be reduced. Here, the transmission is performed under time restriction, while it may be performed in the order of channel numbers, or successively from audio samples of upper bytes to audio samples of lower bytes. Other transmission methods can be employed as long as the order in which data are transmitted is uniquely defined.

In this first embodiment, the drive of the DVD-Audio is employed as the digital audio output apparatus 21. However, any apparatus which outputs arbitrary digital audio data may be applied thereto, such as a drive of a recording medium such as a CD, a MD, a DAT and a DVD-Video, a tuner which receives digital audio broadcasts of digital TV broadcasting or digital radio, an AD converter which converts analog audio into digital audio and outputs the digital audio, and a PC which plays back audio data received via Internet.

In this first embodiment, data of the receiving apparatus 23 is outputted to the digital audio playback apparatus 24, while any apparatus which utilizes digital audio may be used, such as an apparatus for recording digital audio and an apparatus for editing digital audio.

Further, in this first embodiment, the transmission method according to the MOST format is employed, while the present invention can be applied to any transmission method by which time slots are included in frames of a prescribed cycle, and a transmission apparatus and a receiving apparatus for performing transmission use the time slots which are previously allocated thereto, to perform the transmission. As an example of such transmission method, there is a D2B optical (Reference: "The D2B Optical Bus—An Integration platform for Car Entertainment and Telematic Systems", by Peter Mros, Proc. of World Congress on Intelligent Transport Systems Technical Sessions, October 1997). Further, the transmission line is not limited to the time slot type but the present invention can be applied to any transmission line of IEEE 1394 or the like.

The AUX data is not limited to the example shown in FIG. 4, while any format data may be employed, as long as it is composed of sampling frequency information, quantization word length information and channel assignment information, and the arrangement of audio data that is to be transmitted is defined. The respective data of the sampling frequency information, the quantization word length information and the channel assignment information may be transmitted by arbitrary frames, whereby an arbitrary number of bits representing necessary information can be used and thus an arbitrary value can be employed. Further, in addition to the sampling frequency information, the quantization word length information and the channel assignment information, any data which is required for playback of audio data to be transmitted can be included, such as conditions for reduction of the sampling frequency or the quantization word length, and the presence or absence of emphasis. When the sampling frequency or the quantization word length has a fixed value, that information is unnecessary and can be omitted.

Further, the AUX data is multiplexed with audio data and transmitted by the synchronous channel. However, at the insertion of a disc, or at the top of music or when the state of the music is changed, or at established periods, the AUX data may be transmitted by an asynchronous channel or the like. Here, the asynchronous channel is an area that is used to transmit data which does not require time restriction. As examples of the asynchronous channel, there are a control channel and an Asynchronous channel, defined in the MOST. As examples of data transmitted by the control channel, there are operation command information (playback, fast forward and the like), and menu information (program list and the like). Further, as examples of data transmitted by the Asynchronous channel, there are map data and Internet data (IP packet).

Figure 10:
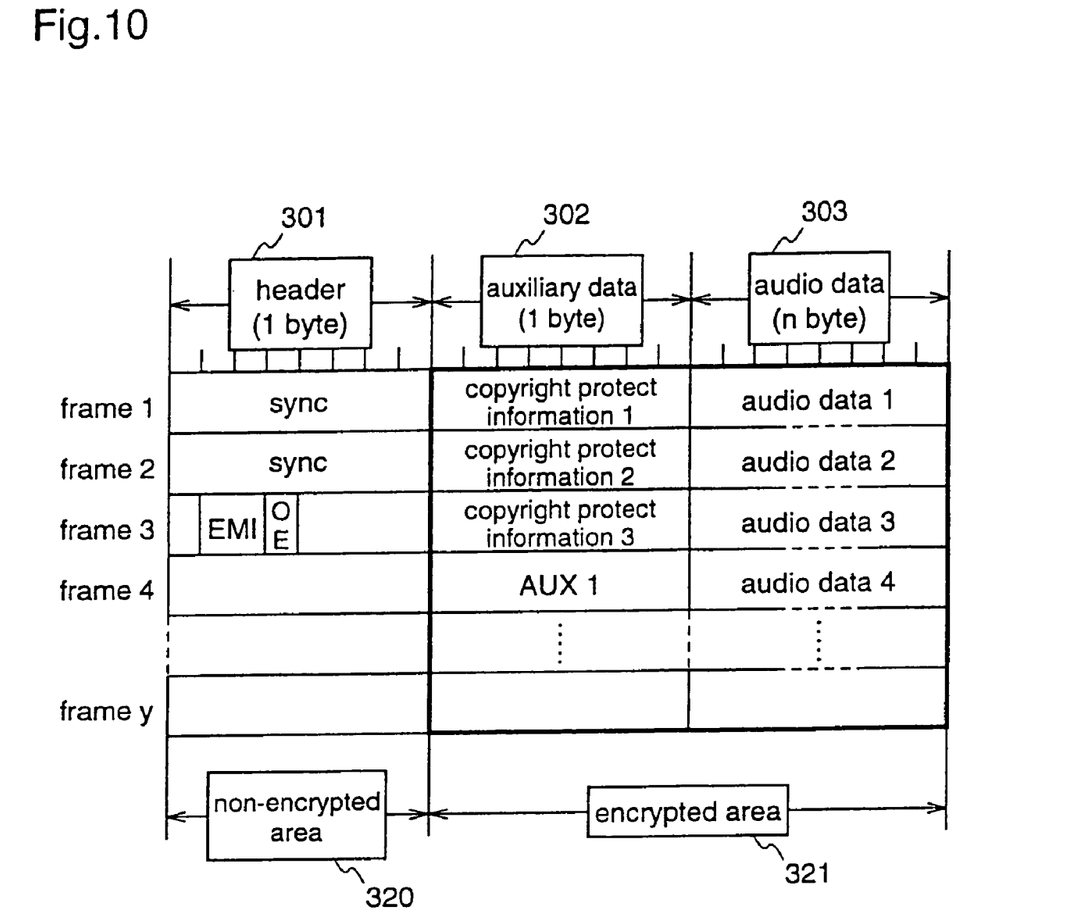
FIG. 10 is a diagram illustrating another example of block data transmitted by the transmission system of the first embodiment.

Furthermore, the format of the block data is not limited to that shown in FIG. 2. In this first embodiment, one block is composed of eight frames correspondingly to eight bytes of the encryption unit, while one block may consists of "a multiple of 8" frames, as shown in FIG. 10. Further, it is also possible that one block is composed of 16 frames, the first bytes of first 8 frames are assumed to be the header, and the first bytes of latter 8 frames are assumed to be areas for auxiliary data. The encryption unit is not limited to 8 bytes but may be "n" bytes other than 8, and in this case the number of frames constituting one block is set to be a multiple of "n". Further, the structure of the block is not limited to the abovementioned structures. Any structure is possible as long as the total amount of data in the encryption area included in frames which are selected as a block is a multiple of the encryption unit. In this case, the same effects can be obtained by using a block that is composed of an arbitrary number of frames.

The transmission of respective audio samples is performed according to the arrangement shown in FIG. 6, while it is not limited to this arrangement. As long as in which position in a frame each audio sample of each channel is arranged is decided between the transmission apparatus and the receiving apparatus, the audio samples may be arranged arbitrarily. The arrangement can be decided according to previously decided rules, or an arrangement method may be shared before the transmission of audio data.

What is claimed is:

1. A transmission system for repeatedly transmitting and receiving at a constant frequency digital audio data of a plurality of channels and auxiliary data required to playback the digital audio data, said transmission system comprising:
a transmission apparatus having an encryption unit comprising an encryptor and a plurality of multiplexers in communication with the encryptor so as to encrypt the digital audio data in block data; and
a receiving apparatus in communication with the transmission apparatus, the receiving apparatus having a decoding unit comprising a decoder and a plurality of demultiplexers in communication with the decoder so as to decode from the block data the encrypted digital audio data, wherein the block data has a plurality of frames each with time slots reserved for a header portion and a pre-determined encryption unit that comprises an auxiliary data portion and an audio data portion in which the digital audio data is encrypted, wherein the reserved time slots amount to a multiple of n when the predetermined encryption unit is n bytes, wherein the encryptor, the decoder, the multiplexers, and the demultiplexers are responsive to a clock signal and are synchronized with one or more of the others by a periodic signal with a cycle that depends on the number of frames in the block data so that the auxiliary data and the encrypted digital audio data are identified, respectively, with the auxiliary data portion and the audio data portion of respective frames within the block data, and wherein the auxiliary data and the digital audio data of the same channel and at the same bit position among said digital audio data are located at the same position among the respective frames.

2. The transmission system of claim 1, wherein the predetermined encryption unit is 8 bytes.

3. The transmission system of claim 1, wherein the auxiliary data includes at least copy permission information indicating whether copying of the digital audio data is permitted or not.

4. The transmission system of claim 1, wherein a transmission method in the communication unit complies with a MOST method.

5. A transmission apparatus used in a transmission system for repeatedly transmitting and receiving at a constant frequency digital audio data of a plurality of channels and auxiliary data required to playback the digital audio data, said transmission apparatus comprising:
- a communication unit configured to generate a clock signal; and
- an encryption unit in communication with the communication unit, the encryption unit comprising a first multiplexer, a second multiplexer, and an encryptor, the combination of which is configured to encrypt the digital audio data in block data,
- wherein the block data has a plurality of frames each with time slots reserved for a header portion and a pre-determined encryption unit that comprises an auxiliary data portion and an audio data portion in which the digital audio data is encrypted,
- wherein the reserved time slots amount to a multiple of n when the predetermined encryption unit is n bytes,
- wherein the encryptor and the multiplexers are responsive to the clock signal and are synchronized with one another by a periodic signal with a cycle that depends on the number of frames in the block data so that the auxiliary data and the encrypted digital audio data are identified, respectively, with the auxiliary data portion and the audio data portion of respective frames within the block data, and
- wherein the auxiliary data and the digital audio data of the same channel and at the same bit position among said digital audio data are located at the same position among the respective frames.

6. The transmission apparatus of claim 5 wherein the predetermined encryption unit is 8 bytes.

7. The transmission apparatus of claim 5 wherein the auxiliary data at least includes copy permission information indicating whether copying of the digital audio data is permitted or not.

8. The transmission apparatus of claim 5 wherein a transmission method in the communication unit complies with a MOST method.

9. A receiving apparatus which is employed in a transmission system for repeatedly transmitting and receiving at a constant frequency digital audio data of a plurality of channels and auxiliary data required to playback the digital audio data, said receiving apparatus comprising:
- a communication unit configured to generate a clock signal; and
- a decoding unit comprising a first demultiplexer, a second demultiplexer, and a decoder, the combination of which is configured to decode the digital audio data from block data,
- wherein the block data has a plurality of frames each with time slots reserved for a header portion and a pre-determined encryption unit that comprises an auxiliary data portion and an audio data portion in which the digital audio data is encrypted,
- wherein the reserved time slots amount to a multiple of n when the predetermined encryption unit is n bytes,
- wherein the decoder and the demultiplexers are responsive to the clock signal and are synchronized with one another by a periodic signal with a cycle that depends on the number of frames in the block data so that the auxiliary data and the encrypted digital audio data are identified, respectively, with the auxiliary data portion and the audio data portion of respective frames within the block data, and
- wherein the auxiliary data and the digital audio data of the same channel and at the same bit position among said digital audio data are located at the same position among the respective frames.

10. The receiving apparatus of claim 9 wherein the predetermined encryption unit is 8 bytes.

11. The receiving apparatus of claim 9 wherein the demultiplexer demultiplexes copy permission information indicating whether copying of the digital audio data is permitted or not from the auxiliary data, and in which said multiplexer is operated under a control of the copy permission information.

12. The receiving apparatus of claim 9 wherein a transmission method in the communication unit complies with a MOST method.

* * * * *